United States Patent

[11] 3,579,116

[72] Inventor Herbert Knirsch
Erding, Klettham, Germany
[21] Appl. No. 782,687
[22] Filed Dec. 10, 1968
[45] Patented May 18, 1971
[73] Assignee Schlumberger overseas Messgeratebau und Vertrieb G.m.b.H.
Munich, Germany

[54] FREQUENCY MIXER
5 Claims, 1 Drawing Fig.

[52] U.S. Cl. .......... 325/439, 321/60, 325/430, 325/446, 328/15
[51] Int. Cl. .......... H04b 1/26
[50] Field of Search .......... 325/430, 442, 445, 446, 438, 439, 436, 450; 321/60, 68, 69; 328/15, 16; 332/43, 47

[56] References Cited
UNITED STATES PATENTS
2,654,836 10/1953 Beck et al. .......... 325/446X

*Primary Examiner*—Robert L. Griffin
*Assistant Examiner*—R. S. Bell
*Attorneys*—William R. Sherman, Stewart F. Moore and Jerry M. Presson

ABSTRACT: A frequency mixer for mixing two time-varying input signals of substantially different dominant frequencies has the signal of higher frequency applied to an impedance having two ends connected in a circuit with two assymetrically-conductive, nonlinear elements. These elements serve to mix the higher frequency signal with the signal of lower frequency, the two elements being poled in the same current-conducting direction and the latter signal being applied to a junction intermediate the two elements. The higher frequency signal is applied to the two ends of the impedance by a balun comprising two parallel conductors wound upon a high-frequency transformer element; one end of the conductor receiving the signal of higher frequency and the other end being connected to ground potential which traces through to a corresponding end of the impedance. A circuit tuned to a desired sum or difference frequency has s signal output end connected to a point on the impedance between the two ends thereof.

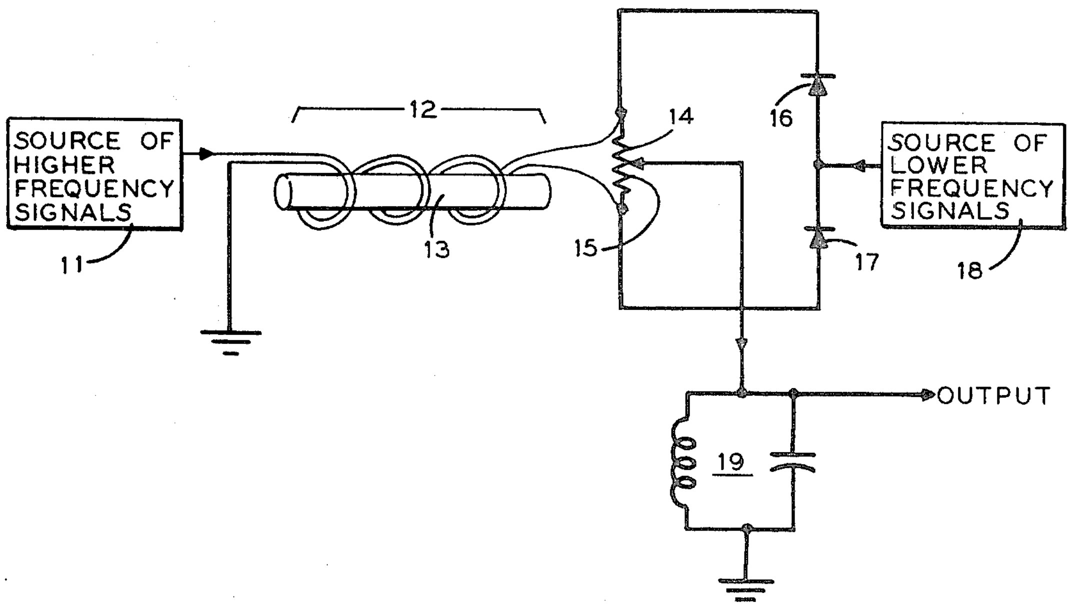
INVENTOR.
Herbert Knirsch
BY
ATTORNEY

FREQUENCY MIXER

This invention relates generally to electrical circuits for mixing time-varying electrical signals or different frequencies and more particularly, to frequency mixers which are especially adaptable for use in frequency synthesizers.

Conventional frequency synthesizers typically utilize one or more frequency mixers of the type presently under consideration. In such synthesizers, signal frequencies derived from various frequency generating sources are mixed by frequency mixers to provide a plurality of different signal frequencies at the frequency synthesizer output. Typically, the different signal frequencies are produced in decade frequency steps or increments. Oftentimes in such synthesizers, the two frequencies which are required to be mixed differ in frequency from one another by at least one order of magnitude and the generated mixed frequency is oftentimes very nearly equal to one of the input frequencies. Accordingly, it is often difficult to suppress at the output of the mixer the input signal having the considerably higher frequency, especially if the higher frequency input signal is also the input signal of higher amplitude.

Conventional frequency mixers which have been used in the art to suppress the higher frequency input signals include so-called "push-pull-mixers." This type of mixer typically utilizes one or more transformers having a physically symmetrical, center-tapped coil or winding. However, these prior art mixers have a distinct frequency limit because for higher frequencies, that is, frequencies in the general range of 10 to 100 MHz., the transformer losses and nonsymmetries introduced into the mixed signal become excessive from a practical standpoint. Accordingly, conventional mixers realize a parallel suppression or, expressed more specifically, a damping or attenuation of the supplied frequency relative to the mixed frequency, which typically amounts to about 20 decibels.

For very high frequencies, that is, frequencies in the GHz. (gigahertz) range, those working in the art often resort to so-called "quarter-wavelength lines." By utilizing such lines the undesired frequency is greatly attenuated or damped whereas the mixed frequency is passed with only slight damping or attenuation. However, this type of circuit suffers the disadvantage of being limited to only a fixed, predetermined frequency. Further, to be used with signal frequencies in the MHz. and GHz., ranges such a circuit would be very cumbersome and expensive to fabricate.

It is an object of this invention to provide new and improved frequency mixer.

Another object of the invention is to provide a relatively simple and inexpensive circuit for mixing the frequencies of two electrical signals of considerably different relative frequencies.

According to this invention, there is provided a frequency mixer which receives two electrical input signals of different relative frequencies, the input signal of higher frequency being applied in a nonsymmetrical fashion to one end of a balun which preferably takes the form of a bifilar winding wound upon a high-frequency ferrite rod torroid or other conventional transformer shape. The bifilar winding has a double-ended input and a symmetrical, double-ended output. One of the double-ended inputs is connected to ground and the other input is connected to a high-frequency signal source. The output ends of the winding are respectively connected to two input terminals of a tapped impedance such as a resistance connected to different ones of the outputs of the bifilar winding. Ground potential applied to the one bifilar winding input traces through to ground a correspondingly one of the two resistance input terminals. The two input signals are mixed by a pair of conventional diodes and the resulting sum and difference frequencies are tapped off the impedance and applied to one end of a tank circuit which is tuned to pass one of the resulting frequencies.

Viewed from the impedance, the bifilar winding appears as two parallel conductors which provide an exceptionally high source impedance to the higher frequency signal applied to the single-ended input thereof. Any damping of the higher frequency signal is solely the result of nonsymmetries in the bifilar winding. One embodiment of the instant invention contemplates a tapped impedance which is comprised of two resistors having resistance values selected to provide the required impedance matching conditions, and another embodiment contemplates a single variable resistor which serves the same purpose.

The utilization of a balun is a relatively simple and inexpensive solution to the problem of providing the necessary relative frequency independence between the two input signals, and further the balun provides a substantially improved decoupling compared to circuits previously in use. For example, a typical signal ratio obtainable between the high frequency input signal and the signal at that same frequency, which constitutes an unwanted feedthrough signal in the mixer, is typically between 40 and 50 db.

For a better understanding of the present invention, together with other and further objects thereof, reference may be had to the following description taken in connection with the single accompanying drawing, wherein there is illustrated a schematic of one embodiment of the instant frequency mixer.

Referring now to the drawing, the instant frequency mixer includes a signal source 11 for supplying the higher dominant frequency of the two frequencies, which are to be mixed.

The higher frequency signals obtained from the source 11 are nonsymmetrically applied to one input terminal or end of a conventional balun, which may comprise a bifilar line 12 having the other input terminal or end connected to ground potential. The bifilar line is wound about a core 13 composed of a high frequency material, such as iron ferrite. Normally, only a few, for example 10 or less, turns of bifilar line need be wound around the core. The core 13 may be of cylindrical, torroidal, or other conventional shape, the particular shape being selected in view of practical conditions because it does not influence the performance of the balun to any appreciable extent.

The bifilar line 12 is terminated at its other end by a center-tapped impedance which in one form may comprise two resistors 14 and 15 of very nearly equal resistance. The signal of lower frequency which is to be mixed with the considerably higher frequency signal obtained from the source 11 is derived from a source 18 and is applied to the junction formed between the respective anode and cathode junctions of mixing diodes 16 and 17, respectively. The diodes 16 and 17 are poled cathode to anode and have matched characteristics. The diodes 16 and 17 comprise the two, nonsymmetrical or unilateral nonlinear elements required to mix the high and low frequency input signals which may have frequency ratios of, for example, 10:1. The respective cathode and anode junctions of the diodes 16 and 17 are connected to the input terminals of the resistors 14 and 15, respectively, which receive high and zero frequency input signals, respectively, from the bifilar line 12.

At the center-tap of the two resistors 14 and 15 the mixed frequency is taken off and applied to the "high" voltage end of an LC tank circuit 19, the opposite end of the circuit 19 being grounded. The tank circuit 19 is tuned to provide a short circuit to ground to all frequencies except the mixed frequency of interest, and therefore the pass band of the circuit 19 is determined by the range of the resulting sum or difference frequency of interest. With the tank circuit 19 thereby tuned, the lower frequency input signal is not troublesome because it is outside the pass band of the tank circuit 19.

To facilitate the tuning of the instant mixer, instead of employing two resistors 14 and 15 only a single resistor having an adjustable contact or wiper arm may be utilized.

I claim:

1. A circuit for mixing two time varying electrical signals of different relative frequencies, one of the signal frequencies being considerably higher than the other, the circuit comprising:

means including an impedance having a center tap connection thereto;

balun means having an input circuit for receiving the higher frequency signal unbalanced with respect to a reference potential and providing an output coupling of said higher frequency signal across said impedance and balanced with respect to said reference potential;

nonlinear circuit means for generating a signal band of mixed frequencies in response to said two electrical signals of different relative frequencies, said nonlinear circuit means having an input circuit receiving the lower frequency signal and being coupled across said impedance for receiving said higher frequency signal; and tuned circuit means coupled to the center tap of said impedance for providing an output signal of a predetermined frequency within said mixed frequency band.

2. The circuit as defined in claim 1 wherein aid nonlinear circuit means comprises:

two series connected assymetrically-conductive devices having nonlinear voltage-current characteristics and being poled in the same current-conducting direction, the lower frequency signal being applied to said nonlinear circuit means at the junction of said devices.

3. The circuit as defined in claim 1 wherein said balun means comprises:

a high frequency ferrite core and a bifilar winding on said core, said bifilar winding including two electrical conductors, each of said conductors having an input and an output end, the output ends of said conductors being connected across said impedance and the input ends of said conductors being respectively connected to a reference potential and to a source of the one signal of higher relative frequency.

4. The circuit as defined in claim 3 wherein said impedance comprises a resistance element and wherein said tuned circuit means is coupled to said resistance element at a point intermediate the ends thereof.

5. The circuit as defined in claim 4 wherein said nonlinear circuit means comprises two series connected assymetrically conductive devices having nonlinear voltage-current characteristics and being poled in the same current conduction direction, the lower frequency signal being applied to said nonlinear circuit means at the junction of said devices.